United States Patent [19]

Brodine et al.

[11] 4,185,584
[45] Jan. 29, 1980

[54] SIGNAL DEVICE

[75] Inventors: Walter E. Brodine, Hudson; Leslie B. Gajdos, Lakewood, both of Ohio

[73] Assignee: The B. F. Goodrich Company, Akron, Ohio

[21] Appl. No.: 970,772

[22] Filed: Dec. 18, 1978

[51] Int. Cl.² .............. F16K 17/40; G01L 19/12
[52] U.S. Cl. .................. 116/272; 73/744; 137/71; 176/38
[58] Field of Search ........... 116/272, 266, 268; 73/744; 176/38; 137/71

[56] References Cited

U.S. PATENT DOCUMENTS

| | | | |
|---|---|---|---|
| 2,888,025 | 5/1959 | Greenwood et al. | 137/71 |
| 3,203,246 | 8/1965 | Horwitt et al. | 73/744 |
| 3,691,981 | 9/1972 | Rao | 116/272 |
| 3,742,970 | 7/1973 | Gross | 116/268 X |
| 3,872,875 | 3/1975 | Raidl, Jr. | 137/71 |

Primary Examiner—Daniel M. Yasich
Attorney, Agent, or Firm—Joe A. Powell; Michael J. Colitz, Jr.

[57] ABSTRACT

A reliable signaling device is provided which will allow an operator of a reactor vessel to ascertain when a leak has occurred in the reactor vessel rupture disc or diaphragm. The signaling device is actuated by pressure which escapes through a leak in the rupture disc. The signaling device makes the operator aware of when a rupture disc is leaking and thereby avoids a potential hazard of the reactor vessel exceeding its designed pressure rating. The signal device when modified may also be used in vacuum operations.

7 Claims, 6 Drawing Figures

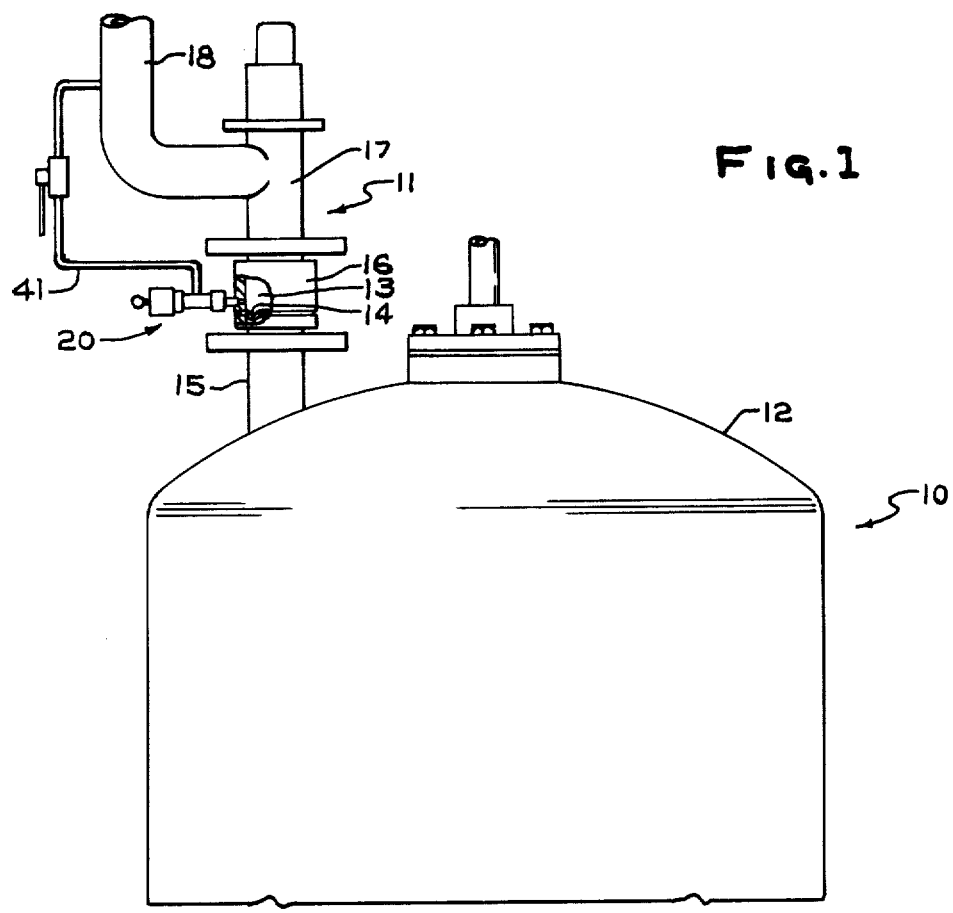
Fig.1
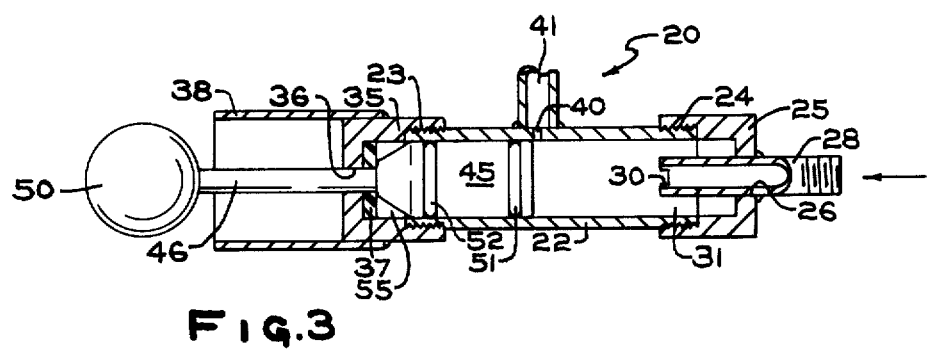
Fig.3
Fig.2

SIGNAL DEVICE

BACKGROUND OF THE INVENTION

Reactor vessels, such as those used in polymerization reactions, often operate under either high pressure or vacuum. These reactor vessels are designed to withstand a predetermined pressure. If the designed pressure of the reactor tank is exceeded, then there is a possibility of the reactor vessel exploding. In order to insure against a potential explosion, it is common practice to provide a rupture disc or diaphragm on the reactor vessel. These rupture discs are designed to rupture at a pressure lower than the design rupture pressure of the reactor vessel. Once the disc ruptures, the pressure inside the reactor is relieved thereby preventing further pressure buildup in the reactor vessel. These rupture discs may be unreliable because they may develop small pin-hole leaks which then allow pressure to increase behind the rupture disc. With a back pressure on the reverse side of the disc, a greater pressure is then required in the reactor vessel in order to rupture the disc. Under these circumstances, it is possible that the reactor vessel may explode even though a rupture disc is present in the reactor vessel. The present invention alleviates this problem.

A pressure gauge installed behind the rupture disc to detect a pressure increase caused by a leak is unsatisfactory in the use of reactor vessels due to the vibration caused by the agitator blades in the reactor tank. The gauges under these conditions become unworkable in a short period of time. Reactor vessels are often very large and an operator standing on the floor cannot visually ascertain the pressure shown by the gauge.

The present invention provides means for signaling an operator when a leak has occurred in a rupture disc whether the pressure in the reactor vessel is normal or abnormal.

SUMMARY OF THE INVENTION

In accordance with this invention, a signaling device is provided for indicating to the operator or those in the vicinity of the reactor vessel that a malfunction has occurred in the rupture disc. The indicating or signaling device is actuated by pressure or vacuum that occurs when a leak develops in a rupture disc or diaphragm. The abnormal pressure is communicated to a piston which then moves an indicator means thereby allowing the indicator means to be clearly viewed by the operator.

To clearly illustrate this invention, reference will henceforth be made to the embodiment of this invention shown in the drawings.

BRIEF DESCRIPTION OF THE DRAWINGS

FIG. 1 is a side elevational view of a portion of a reactor vessel with a vent stack and a signaling device with a portion of the vent stack broken away to disclose a diaphragm.

FIG. 2 is an enlarged cross-sectional view of the signaling device in its normal operating position.

FIG. 3 is an enlarged cross-sectional view of the signaling device in actuated position.

DETAILED DESCRIPTION OF THE INVENTION

Figure 4:
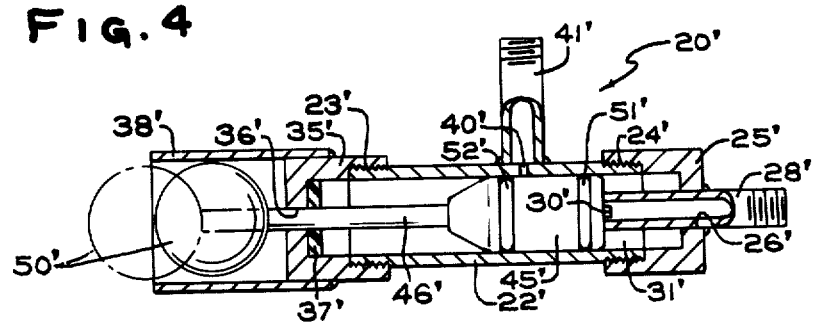
FIG. 4 is an enlarged cross-sectional view of a modified form of a signaling device in its normal operating condition.

Referring to the drawings, wherein like reference numerals designate like or corresponding parts throughout the several views, there is shown in FIG. 1 a reactor vessel 10 which is used to conduct polymerization reactions. A vent stack 11 is connected to the top cover plate 12, which vent has a vertically extending bore 13.

Vent stack 11 consists of a plurality of suitable conduit sections interconnected to form the stack. A diaphragm 14 is suitably clamped between lower sections 15 and 16 and the vent stack 11. The purpose of the diaphragm 14 is to rupture at a pressure which is less than the design rupture pressure of the reactor vessel 10, but higher than the normal operating pressure of the reactor vessel 10. Suitably connected to conduit section 16 is conduit section 17 having an elbow 18 vented via a suitable conduit means to atmosphere.

A signaling device 20 is connected to the section 16, communicating with the bore 13 of section 16 above the diaphragm 14. Signaling device 20 has a cylindrical shaped body member 22 (FIG. 2) which member 22 is threaded at the respective ends as at 23 and 24. Threadedly connected to end 24 is a cup shaped cylindrical member or cap 25. Said cap 25 has a tubular portion and a base portion with a bore 26 extending through such base portion.

A conduit 28 extending through bore 26, has its intermediate portion secured, as by welding, to cap 25. The bore end of conduit 28 is threadedly connected to conduit section 16 above the diaphragm 14 as shown in FIG. 1 to thereby communicate with the bore 13. The other end of conduit 28 is recessed as at 30 for a purpose to be described. An annular chamber 31 is defined by the exterior surface of conduit 28 and the interior surface of cap 25.

Threadedly connected to the other end portion of body member 22 of signaling device 20 is a cap 35 having a bore 36 extending through the base portion thereof. An annular seal 37 is seated against the interior of cap 35. A cylindrical shield 38 has one end suitably secured to cap 35.

The intermediate portion of cylindrical member 22 has a bore 40 extending through the wall portion thereof. A conduit 41 is connected to cylindrical member 22 communicating bore 40 with the passageway or bore within elbow 18.

Slidably received by cylindrical member 22 is a piston 45 having a piston rod or rod 46 suitably connected to the one end portion thereof. The other end or head end of piston 45 is seated against the conduit 28 as shown in FIG. 2. Rod 46 has a spherical element or ball 50 mounted on the outer end thereof. Such ball 50 operates as an indicator means in a manner to be described. Piston 45 has a pair of spaced annular seals 51 and 52 located at the respective end portions thereof.

In its normal operating mode, signaling device 20 is as is shown in FIG. 2 with ball 50 shielded or hidden from view by shield 38. When a leak develops in diaphragm 14, the pressure from the leaking gas is transmitted via the passageway in conduit 28 and through recess 30 to pressurize chamber 31. This pressure actuates piston 45 causing it to slide forward (leftwardly as viewed in FIG. 2) thereby exposing ball 50 as is shown in FIG. 3. The exposure of ball 50 signals the operator that a leak has developed in the rupture disc. The annular seals 51 and 52 on piston 45 prevent pressure from leaking into a cavity 55 defined by the cylindrical member 22, cap 35 and piston 45. Once piston 45 slides past bore 40, the pressure in cavity 31 can escape through bore 40 and is vented to atmosphere by way of conduit 41 to elbow 18.

FIG. 4 discloses a modification of the embodiment described above wherein all elements that are alike have the same reference numerals except that the elements are primed. The modification in FIG. 4 is useful when there is pressure in the vent stock as when several reactors are connected to the same vent stack.

In FIG. 4 a signal device 20' has a cylindrical shaped body member 22' which member 2' is threaded at the respective ends as at 23' and 24'. Threadedly connected to end 24' is a cup-shaped cylindrical member or cap 25'. Said cap 25' has a tubular portion and a base portion with a bore 26' extending through such base portion.

A conduit 28' extending through bore 26' has its intermediate portion secured, as by welding, to cap 25'. The bore end of conduit 28' is threadedly connected to conduit section 16 of FIG. 1 above diaphragm 14 to thereby communicate with bore 13 for purposes as described above. The other end of conduit 28' is recessed as at 30'. An annular chamber 31' is defined by the exterior surface of conduit 28' and the interior surface of cap 25'.

Threadedly connected to the other end portion of body member 22' of signaling device 20' is a cap 35' having a bore 36' extending through the base portion thereof. An annular seal 37' is seated against the interior of cap 35'. A cylindrical shield 38' has one end suitably secured to cap 35'.

The intermediate portion of cylindrical member 22' has a bore 40' extending through the wall portion thereof. A conduit 41' is connected to cylindrical member 22' communicating bore 40' with the passageway or bore within elbow 18 of FIG. 1.

Slidably received by cylindrical member 22' is a piston 45' having a piston rod or rod 46' suitably connected to the one end portion thereof. The other end or head end of piston 45' is seated against the conduit 28'. Rod 46' has a spherical element or ball 50' mounted on the outer end thereof. Such ball 50' operated as an indicator means in a manner described above. Piston 45' has a pair of spaced annular seals 51' and 52' located at the respective end portions thereof.

The modification shown in FIG. 4 operates similar to the mode of operation described above for FIGS. 2 and 3 except that in the normal operating position, when piston 45' is retracted, bore 40' is located between annular seals 51' and 52'. This modification is useful when there is pressure in the vent stack as when multiple reactors are connected to the same vent stack. By having bore 40' located between annular seals 51' and 52' gas located in stack 18 is prevented from entering the signal device. If gas being discharged from another reactor entered the signal device, then this could cause contamination in the device preventing the signal device from functioning properly. Therefore, when multiple reactors are connected to the same vent stack, it is important to have bore 40' located between annular seals 51' and 52' while the signal device is in its normal operating position.

Figure 5:
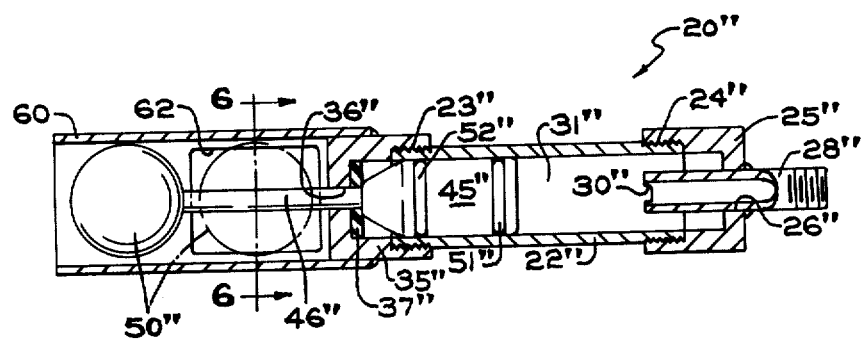
FIG. 5 is an enlarged cross-sectional view of another modification of a signaling device.

FIG. 5 discloses another modification of the embodiment described above wherein all elements that are alike have the same reference numerals except that they are double primed. The modification in FIG. 5 is useful when operating a reactor vessel under vacuum.

In FIG. 5, a signal device 20" has a cylindrical shaped body member 22" which member 22" is threaded at the respective ends as at 23" and 24". Threadedly connected to end 24" is a cup-shaped cylindrical member or cap 25", Said cap 25" has a tubular portion and a base portion with a bore 26" extending through such base portion.

A conduit 28" extending through bore 26" has its intermediate portion secured, as by welding, to cap 25". The bore end of conduit 28" is threadedly connected to conduit section 16 of FIG. 1 above diaphragm 14 to thereby communicate with bore 13. The other end of conduit 28" is recessed as at 30". An annular chamber 31" is defined by the exterior surface of conduit 28" and the interior surface of cap 25".

Threadedly connected to the other end portion of body member 22" of signaling device 20" is a cap 35" having a bore 36" extending through the base portion thereof. An annular seal 37" is seated against the interior of cap 35". A cylindrical shield 60 has one end or the base end suitably secured to cap 35". Cylindrical shield 60 has a pair of recesses 62 and 64 defining windows located adjacent to the base end of shield 60. Such recesses or windows 62 and 64 serve for viewing purposes.

Slidably received by cylindrical member 22" is a piston 45" having a piston rod or rod 46" suitably connected to the one end portion thereof. Rod 46" has a spherical element or ball 50" mounted on the outer end thereof. Such ball 50" operates as an indicator means in a manner described above. Piston 45" has a pair of spaced annular seals 51" and 52" located at the head end and rod end respectively.

The modification shown in FIG. 5 operates similar to that described above for FIGS. 2, 3 and 4 except that in the normal operating postion, piston 45" is extended to abut annular seal 37" and ball 50" is hidden from operator view by cylindrical shield 60. This modification is useful when connected to a reactor vessel operating under vacuum. When a leak develops in diaphragm 14, the vacuum is transmitted by way of bore 26" through recess 30" into chamber 31". This vacuum actuates piston 45" causing it to retract thereby causing ball 50" to move into recesses 62 and 64 of cylindrical shield 60. The exposure of ball 50" signals an operator that a leak has developed in the rupture disc.

Figure 6:
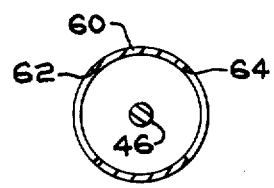
FIG. 6 is an enlarged cross-sectional view of the shield device taken along line 6—6 of FIG. 5.

FIG. 6 is a cross-sectional view of cylindrical shield 60 taken along line 6—6 of FIG. 5. Recesses 62 and 64 are located on opposite sides of shield 60.

Although a specific embodiment with modifications of the invention has been hereinbefore described, it is understood that the subject invention is not limited thereto since variations and modifications thereof can be made without departing from the principles of the invention.

We claim:

1. A signaling device for use on a reactor vessel with a rupture disc for indicating a malfunction in the rupture disc leading to a vent stack of a reactor vessel, said signaling device having a cylindrical shaped member, said cylindrical shaped member having a cap member mounted on the respective end portions thereof to define a central chamber, a conduit having one end extending through one cap member into said chamber for communicating said central chamber with said vent stack for a reactor vessel, a piston slidably received by said chamber and operative between a first and second position, said piston having a head end and a rod end, said conduit being recessed at said one end to communicate that portion of said chamber located between said head end of said piston and said one cap member to said vent stack, said piston in said first position operative to abut said one end of said conduit, a cylindrical shield connected to said other one of said cap members, a bore located in said cylindrical shaped member at the intermediate portion thereof communicating said chamber through said vent stack to atmosphere, an indicator means received by said shield and operatively connected to said rod end of said piston, said piston in said second position operative to move said indicator means out of said shield thereby interconnecting said conduit with said bore in said intermediate portion.

2. A signaling device for use on a reactor vessel as set forth in claim 1 wherein said piston has a pair of spaced annular seals.

3. A signaling device for use on a reactor vessel as set forth in claim 2 wherein said bore is located between said annular seals in said first position of said piston.

4. A signaling device for use on a reactor vessel as set forth in claim 1 wherein an annular seal is seated against the interior of one cap member such that said piston in said second position abuts said annular seal.

5. A signaling device for use on a reactor vessel with a rupture disc for indicating a malfunction in the rupture disc leading to a vent stack of a reactor vessel, wherein said reactor vessel is operating at a pressure less than atmospheric pressure, said signaling device having a cylindrical shaped member, said cylindrical shaped member having a cap member mounted on the respective end portions thereof to define a central chamber, a conduit having one end extending through one cap member into said chamber for communicating said central chamber with said vent stack for a reactor vessel, a piston slidably received by said chamber and operative between a first and second position, said piston having a head end and a rod end, said conduit being recessed at said one end to communicate that portion of said chamber located between said head end of said piston and said one cap member to said vent stack, a cylindrical shield having a base end connected to said other one of said cap members, said cylindrical shield being recessed adjacent the base end of said shield, an indicator means received by said shield and operatively connected to said rod end of said piston, said piston in said first position operative to position said indicator means away from said recessed portion of said shield, said piston in said second position operative to move said indicator means into the recessed portion of said shield.

6. A signaling device for use on a reactor vessel as set forth in claim 5 wherein said piston has a pair of spaced annular seals.

7. A signaling device for use on a reactor vessel as set forth in claim 6 wherein an annular seal is seated against the interior of one cap member such that said piston in said first position abuts said annular seal.

* * * * *